United States Patent
Fukuchi et al.

[11] Patent Number: 5,908,019
[45] Date of Patent: Jun. 1, 1999

[54] INTAKE AIR AMOUNT CONTROL SYSTEM FOR INTERNAL COMBUSTION ENGINES

[75] Inventors: Hironao Fukuchi; Yuichi Shimasaki; Hiroaki Kato; Akihisa Saito; Hideo Furumoto, all of Wako; Takayoshi Nakayama, Tochigi-ken, all of Japan

[73] Assignee: Honda Giken Kogyo Kabushiki Kaisha, Tokyo, Japan

[21] Appl. No.: 08/803,720

[22] Filed: Feb. 21, 1997

[30] Foreign Application Priority Data

Feb. 22, 1996  [JP]  Japan .................................. 8-058275

[51] Int. Cl.⁶ .................................................. F02D 41/16
[52] U.S. Cl. ........................ 123/339.18; 60/300; 219/202
[58] Field of Search ...................... 123/339.18, 339.23; 60/274, 285, 300, 303; 219/202, 205, 497

[56] References Cited

U.S. PATENT DOCUMENTS

| | | | |
|---|---|---|---|
| 4,629,968 | 12/1986 | Butts et al. ................................ | 322/29 |
| 4,771,749 | 9/1988 | Kuiuchi et al. ................. | 123/339.27 X |
| 5,321,231 | 6/1994 | Schmalzriedt et al. .............. | 219/202 X |
| 5,444,976 | 8/1995 | Gonze et al. ......................... | 60/303 X |
| 5,512,789 | 4/1996 | Lyon ..................................... | 60/300 X |

FOREIGN PATENT DOCUMENTS

4-51659  8/1992  Japan .

*Primary Examiner*—Tony M. Argenbright
*Attorney, Agent, or Firm*—Nikaido Marmelstein Murray & Oram, LLP

[57] ABSTRACT

An intake air amount control system for an internal combustion engine installed in an automotive vehicle has an intake air amount control valve arranged in a bypass passage bypassing a throttle valve arranged in an intake passage of the engine. The intake air amount control valve controls the amount of air supplied to the intake passage at a location downstream of the throttle valve. The intake air amount control valve is controlled in dependence on operatives states of electric devices including an electrically-heated catalyzer which are installed on the vehicle and supplied with electric power by an alternator installed on the vehicle and driven by the engine, when the engine is in a predetermined operating condition. The intake air amount control valve is controlled by the use of a correction amount dependent on an operative state of the electrically-heated catalyzer.

8 Claims, 5 Drawing Sheets

INTAKE AIR AMOUNT CONTROL SYSTEM FOR INTERNAL COMBUSTION ENGINES

BACKGROUND OF THE INVENTION

1. Field of the Invention

This invention relates to an intake air amount control system for internal combustion engines, and more particularly to an intake air amount control system of this kind, which controls the amount of intake air supplied to the engine according to electric loads on a generator driven by the engine.

2. Prior Art

Conventionally, there has been used an intake air amount control system for internal combustion engines, as proposed e.g. by Japanese Laid-Open Patent Publication (Kokoku) No. 4-51659, which includes a solenoid valve arranged in a bypass passage connected to an intake pipe of the engine in a fashion bypassing a throttle valve arranged therein. The proposed system controls the amount of intake air supplied to the engine during idling thereof through feedback control of the opening of the solenoid valve by the use of a control amount, more specifically, an amount of electric current to be supplied to the solenoid valve, based on the difference between the actual engine rotational speed and a desired engine rotational speed. The control amount is corrected by the use of electric load-dependent correction terms determined based on operative states of electric loads on a generator driven by the engine, such as an air conditioner and a power steering system.

A catalyzer, which is generally employed in internal combustion engines for purifying exhaust gases emitted from the engine, does not become activated until a considerable time period elapses after the start of the engine when the engine is started in a cold state. To accelerate the activation of the catalyzer, there is conventionally employed an electrically-heated catalyzer which is electrically heated to become promptly activated.

In the conventional intake air amount control system, however, electric power supplied to the electrically-heated catalyzer by the generator driven by the engine is not taken into account. As a result, the engine rotational speed can become unstable or it takes a longer time period to attain a desired engine rotational speed when the electric power is supplied to the electrically-heated catalyzer. This hinders the temperature of the catalyzer from rising promptly and makes it impossible to obtain desired exhaust emission characteristics.

SUMMARY OF THE INVENTION

It is the object of the invention to provide an intake air amount control system for internal combustion engines, which is capable of properly controlling the amount of intake air supplied to the engine having an electrically-heated catalyzer, such that the engine rotational speed is stabilized immediately after the engine is started in a cold state and the electrically-heated catalyzer is activated promptly.

To attain the above object, the invention provides an intake air amount control system for an internal combustion engine installed in an automotive vehicle, the engine including an intake passage, and a throttle valve arranged in the intake passage, the vehicle having an alternator installed thereon which is driven by the engine, and electric devices including an electrically-heated catalyzer, electric power generated by the alternator being supplied to the electric devices, the intake air amount control system including a bypass passage bypassing the throttle valve, an intake air amount control valve arranged in the bypass passage for controlling an amount of air supplied to the intake passage at a location downstream of the throttle valve, and control means for controlling the intake air amount control valve in dependence on operatives states of the electric devices when the engine is in a predetermined operating condition.

The intake air amount control system according to the invention is characterized in that the control means controls the intake air amount control valve by the use of a correction amount dependent on an operative state of the electrically-heated catalyzer.

Preferably, when the electrically-heated catalyzer is being energized, the control means sets the correction amount to a predetermined value, whereas when the electrically-heated catalyzer is not being energized, the control means sets the correction amount to zero.

Alternatively, the intake air amount control system includes an engine rotational speed sensor for detecting rotational speed of the engine, and the control means sets the correction amount to a value dependent on the rotational speed of the engine detected by the engine rotational speed sensor when the electrically-heated catalyzer is being energized.

More preferably, the correction amount is set to a smaller value as the rotational speed of the engine is higher.

Alternatively, the control means sets the correction amount to a first predetermined value upon starting of energization of the electrically-heated catalyzer and then progressively decreases the correction amount to a second predetermined value smaller than the first predetermined value as time elapses, whereas the control means sets the correction amount to a negative value upon termination of the energization of the electrically-heated catalyzer and then progressively increases the correction amount to zero as time elapses.

Preferably, the control means calculates a plurality of correction amounts respectively dependent on the operative states of the electric devices in addition to the correction amount dependent on the operative state of the electrically-heated catalyzer, and controls the intake air amount control valve by the use of the correction amount dependent on the operative state of the electrically-heated catalyzer and the plurality of correction amounts respectively dependent on the operative states of the electric devices.

Preferably, the intake air amount control system includes an atmospheric pressure sensor, and the control means controls the intake air control valve in dependence on the operative states of the electric devices including the operative state of the electrically-heated catalyzer and the atmospheric pressure detected by the atmospheric pressure sensor.

Preferably, the intake air amount control system includes an engine rotational speed sensor for detecting rotational speed of the engine, and the control means controls the intake air amount control system such that the rotational speed of the engine detected by the engine rotational speed sensor becomes equal to a desired value.

Preferably, the intake air amount control valve comprises a solenoid valve, the control means controlling opening of the solenoid valve through control of electric current supplied to the solenoid valve.

The above and other objects, features, and advantages of the invention will be more apparent from the following

DETAILED DESCRIPTION

The invention will now be described in detail with reference to the drawings showing an embodiment thereof.

Figure 1:
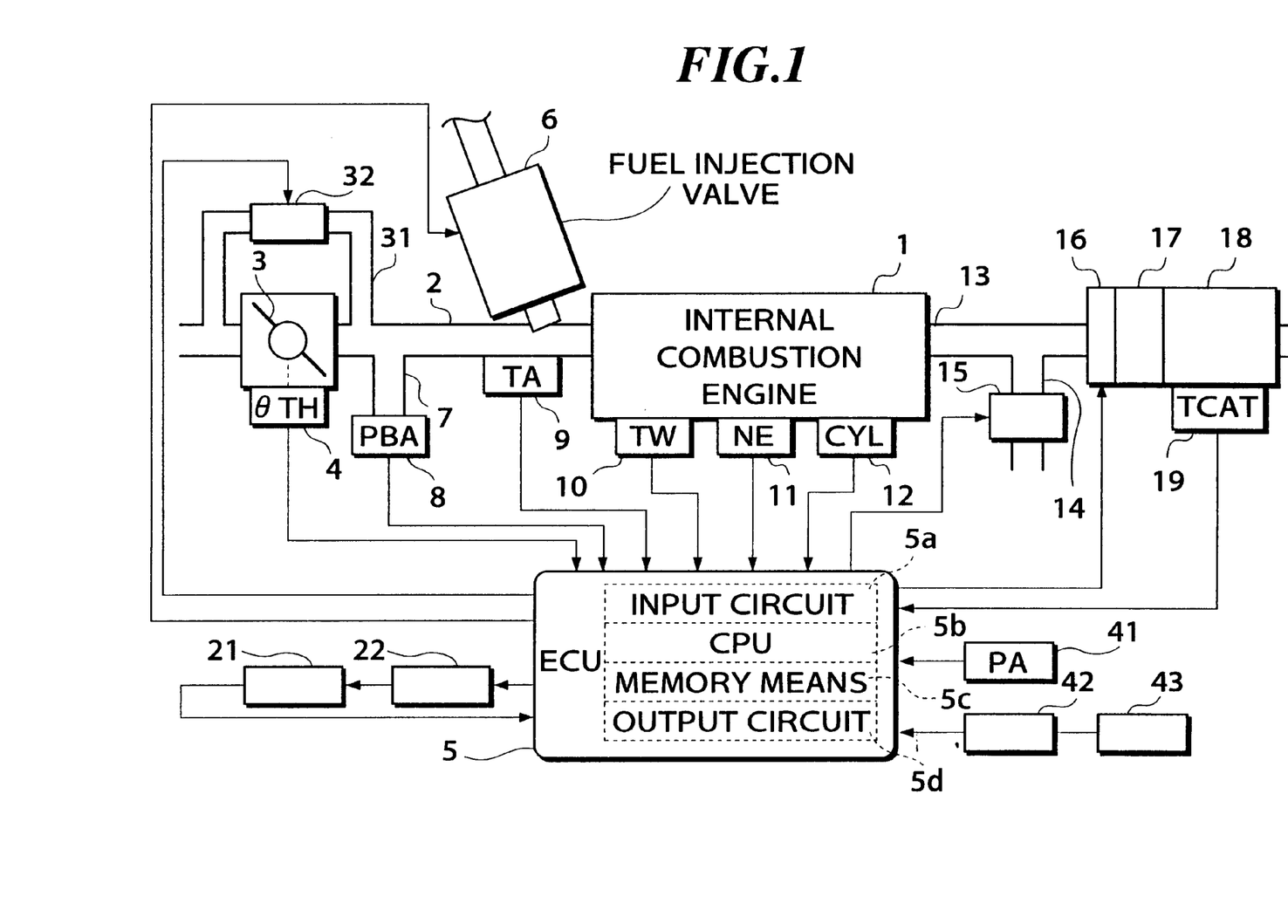
FIG. 1 is a block diagram schematically showing the whole arrangement of an internal combustion engine and an intake air amount control system therefor, according to an embodiment of the invention.

Referring first to FIG. 1, there is illustrated the whole arrangement of an internal combustion engine and an intake air amount control system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

A bypass passage 31 is connected to the intake pipe 2 in a fashion bypassing the throttle valve 3. The bypass passage 31 has a solenoid valve 32 arranged therein for controlling the amount of intake air supplied to the engine during idling thereof. The solenoid valve 32 is electrically connected to the ECU 5. The ECU 5 controls control current ICMD to be supplied to a solenoid of the solenoid valve 32, to thereby control the amount of opening of the solenoid valve 32, i.e. the intake air amount.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "the TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such as HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is electrically connected to the ECU 5 via a regulator 22 such that voltage of electricity generated by the alternator 21 is controlled by a signal from the ECU 5. More specifically, the ECU 5 delivers to the regulator 22 a command signal for setting a duty factor DUTY of a field winding of the alternator 21 to thereby control voltage generated by the alternator 21. Further, in response to a signal IFLD indicative of electric current (hereinafter referred to "the field current") flowing to the field winding of the alternator 21, which is supplied to the ECU 5, the ECU 5 corrects the control current ICMD supplied to the solenoid valve 32.

Also connected to the ECU 5 are an atmospheric pressure sensor 41 for detecting atmospheric pressure PA and an operative state detector 42 for detecting operative states of electric devices 43, and electric signals indicative of the sensed atmospheric pressure PA and operative states of the electric devices 43 are supplied to the ECU 5. The operative state detector 42, which is mounted on an automotive vehicle on which the engine 1 is installed, detects operative states of the electric devices 43, i.e. an air conditioner, an automatic transmission, a power steering system, and other electric devices including headlights and a window heater, as electric loads on the alternator 21, and supplies the ECU 5 with signals respectively indicative of whether the air conditioner is on or off, whether or not the shift position of the automatic transmission is in a drive range, whether or not the power steering system is in operation, and ON/OFF states of the other electric devices (i.e. the headlights, the window heater, etc.).

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, solenoid valve 32, EHC 16, regulator 22, etc., for driving the same.

The CPU 5b calculates the control current ICMD to be supplied to the solenoid valve 32, an energization time period TEHC over which the EHC 16 is to be energized and the duty factor DUTY of the field winding of the alternator 21 in response to the output signals from the respective sensors, to generate control signals based on results of the calculations.

Figure 2:
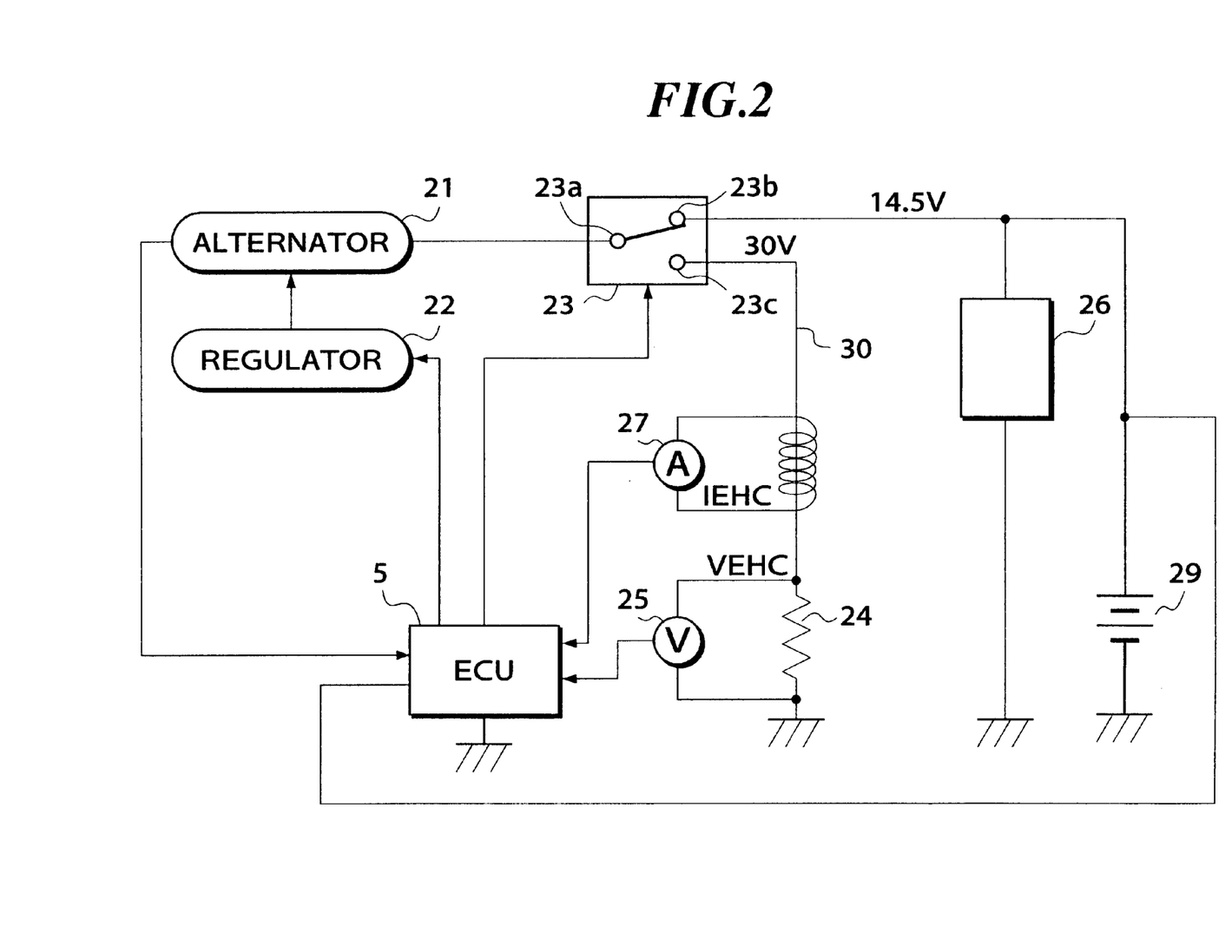
FIG. 2 is a circuit diagram showing the connection of a heater resistance of an electrically-heated catalyzer appearing in FIG. 1 and its related or peripheral circuit parts.

FIG. 2 shows a circuit formed by the ECU 5, the alternator 21, the regulator 22, a heater resistance 24 of the EHC 16, electrical equipment 26, and a battery 29. The EHC 16 employed in the present embodiment also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded.

The changeover switch 23 has a further terminal 23b connected to a positive electrode of the battery 29 as well as to one end of the electrical equipment 26. The other end of the electrical equipment 26 is grounded. The battery 29 has its negative electrode grounded and its positive electrode connected to the ECU 5. The ECU 5 measures an output terminal voltage (hereinafter referred to "the output voltage") VB of the battery 29.

The changeover switch 23 is electrically connected to the ECU 5 to have its switching operation controlled by a signal from the ECU 5. The switch 23 is normally in a position shown in FIG. 2 in which the terminals 23a and 23b of the switch 23 are connected to each other, and controlled to be changed in position from its illustrated position immediately after the start of the engine 1, if required. Further, a voltage sensor 25 is connected to both ends of the heater resistance 24, to detect voltage VEHC across the heater resistance 24. The voltage sensor 25 is electrically connected to the ECU 5, for supplying a signal indicative of the sensed voltage VEHC across the heater resistance 24. Further, an electric current sensor 27 is provided on the connecting line 30, to detect heater current IEHC supplied to the heater resistance 24. The electric current sensor 27 is electrically connected to the ECU 5, for supplying a signal indicative of the sensed electric current to the ECU 5.

The switch 23 has its terminal connection changed such that the terminals 23a and 23c are connected to each other, only when the heater resistance 24 of the EHC 16 is to be energized. The energization time period TEHC over which the EHC 16 is required to be heated is determined based on the engine coolant temperature TW and the intake air temperature TA detected at the start of the engine 1. Further, according to the present embodiment, when the switch 23 is switched to the terminal 23b side, the output voltage from the alternator 21 is set to a first predetermined voltage VALT1 (e.g. 14.5 V). On the other hand, when the switch 25 is switched to the terminal 23c side, the output voltage from the alternator 21 is set to a second predetermined voltage VALT2 (e.g. 30 V) to thereby decrease the electric current supplied to the heater resistance 24 during the energization time period TEHC.

Next, a program for calculating the control current ICMD to be supplied to the solenoid valve 32, which is executed by the CPU 5b, will be described. This program is executed, for example, whenever a TDC signal pulse is generated, or at predetermined time intervals.

The control current ICMD is calculated by the use of the following equation (1) when the engine 1 is in a starting mode (i.e. cranking mode), while it is calculated by the use of the following equation (2) when the engine 1 is in a steady idling condition:

$$ICMD = (IXREFM + ILOAD) \times KIPA \qquad (1)$$

$$ICMD = (IFB + ILOAD) \times KIPA \qquad (2)$$

where IXREFM represents a predetermined current value for the starting mode of the engine 1, ILOAD an electric load-dependent correction term set based on states of electric loads on the alternator 21, as described hereinafter, KIPA a correction coefficient set according to atmospheric pressure PA, and IFB a feedback control term set according to the difference between the engine rotational speed NE and a desired engine rotational speed NEOBJ such that the former becomes equal to the latter.

Figure 3:
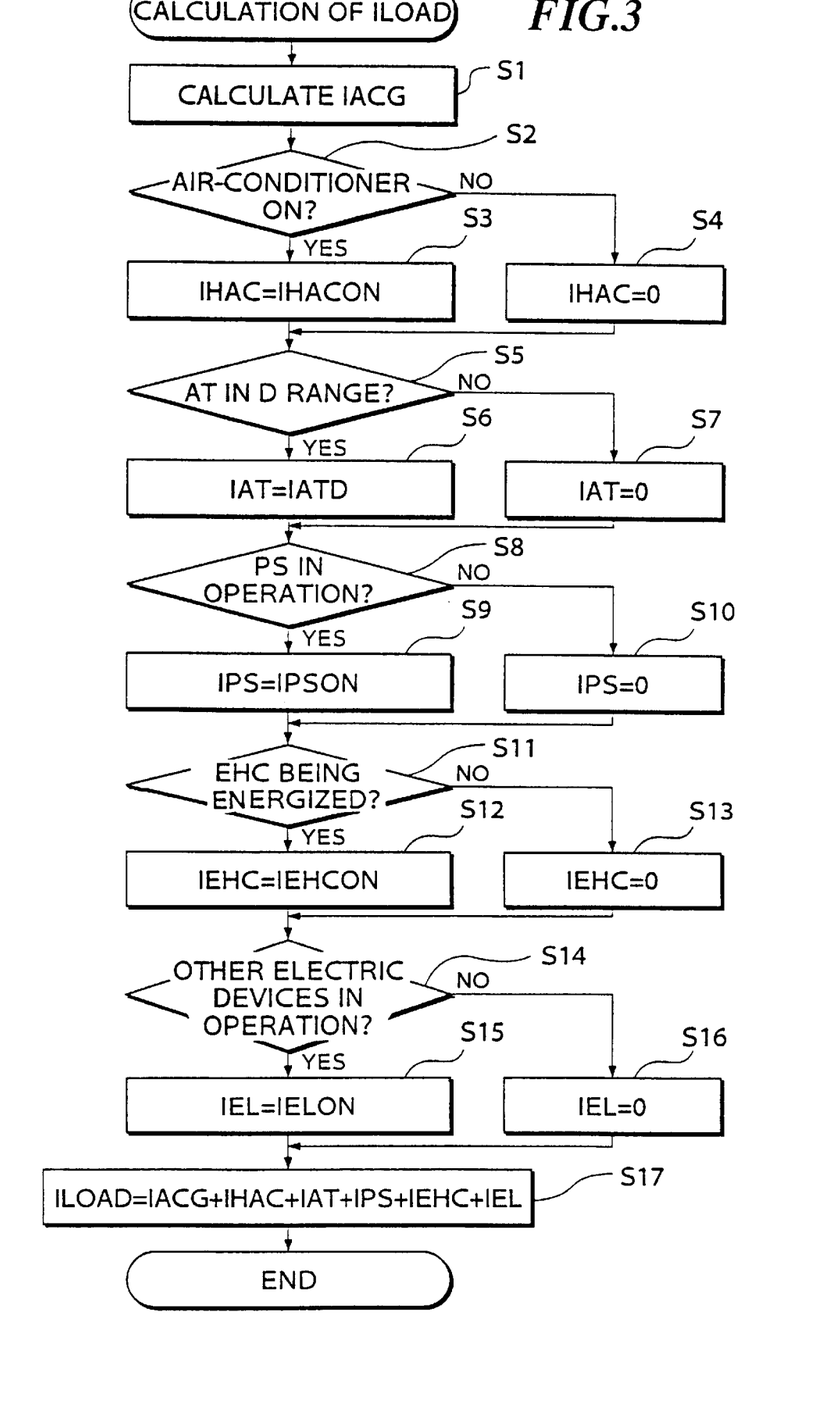
FIG. 3 is a flowchart showing a routine for calculating an electric load-dependent correction term.

FIG. 3 shows a routine for calculating the electric load-dependent correction term ILOAD.

First, at a step S1, a field current-dependent correction term IACG is calculated based on the field current IFLD of the alternator 21. Specifically, when the engine rotational speed NE is lower than a predetermined engine rotational speed NECAL (e.g. 2000 rpm), the correction term IACG is set to a larger value as the field current IFLD increases, whereas when NE>NECAL holds, it is set to "0".

Next, it is determined at a step S2 whether or not the air conditioner is in operation. If the air conditioner is in operation, an air conditioner-dependent correction term IHAC is set to a predetermined value IHACON (>0) at a step S3, whereas if the air conditioner is not in operation, the correction term IHAC is set to "0" at a step S4. At the following step S5, it is determined whether or not the shift position of the automatic transmission (AT) is in the drive range. If the shift position is in the drive range, an AT-dependent correction term IAT is set to a predetermined value IATD (>0) at a step S6. If the shift position is not in the drive range, the correction term IAT is set to "0" at a step S7, followed by the program proceeding to a step S8.

At the step S8, it is determined whether or not the power steering system (PS) is in operation. If the power steering system is in operation, a PS-dependent correction term IPS is set to a predetermined value IPS (>0) at a step S9, whereas if the power steering system is not in operation, the correction term IPS is set to "0" at a step S10. Then, it is determined at a step S11 whether or not the EHC 16 is being energized. If the EHC 16 is being energized, an EHC-dependent correction term IEHC is set to a predetermined value IEHCON (>0) at a step S12. If the EHC 16 is not being energized, the correction term IEHCON is set to "0" at a step S13, followed by the program proceeding to a step S14.

At the step S14, it is determined whether or not the other electric devices (EL) are in operation, e.g. whether or not the headlights, the window heater, etc. are in operation. If any one of the electric devices is in operation, an EL-dependent correction term IEL is set to a predetermined value IELON (>0) at a step S15, whereas if none of the electric devices are in operation, the correction term IEL is set to "0" at a step S16. Then, at a step S17, the correction term ILOAD is calculated by the use of the following equation (3), followed by terminating the program:

$$ILOAD = IACG + IHAC + IAT + IPS + IEHC + IEL \quad (3)$$

As described above, according to the present embodiment, the electric load-dependent correction term ILOAD is calculated by the use of the correction term IEHC which is set depending on whether the EHC is being energized. This makes it possible to prevent the engine rotational speed from becoming unstable due to energization of the EHC 16, and activate the EHC 16 promptly.

Figure 4:
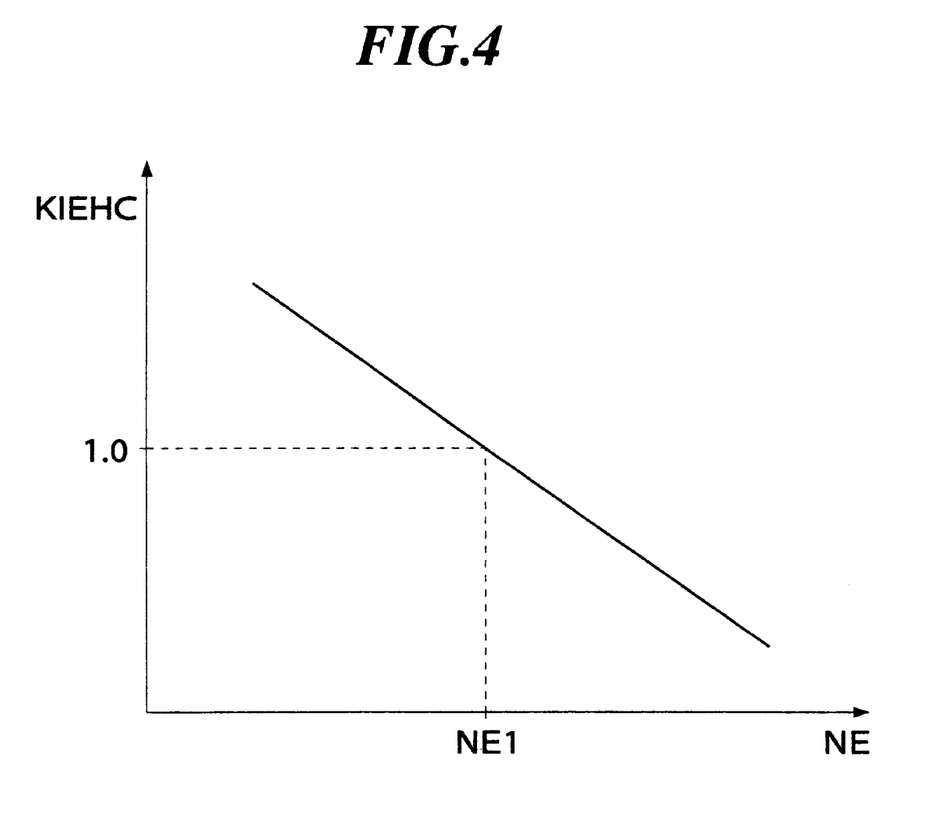
FIG. 4 is a graph showing the relationship between an electrically-heated catalyzer-dependent correction term KIEHC and engine rotational speed NE.

Further, although in the FIG. 3 routine, the correction term IEHC is set to the predetermined reference value IEHCON when the EHC 16 is being energized, this is not limitative, but the correction term IEHC may be set according to the engine rotational speed NE, for example, by the use of the following equation (4):

$$IEHC = IEHCON \times KIEHC \quad (4)$$

where KIEHC represents a correction coefficient which is set, as shown in FIG. 4, such that it decreases as the engine rotational speed NE increases. In FIG. 4, NE1 represents a desired value of the desired engine rotational speed set when the EHC 16 is energized.

Figure 5:
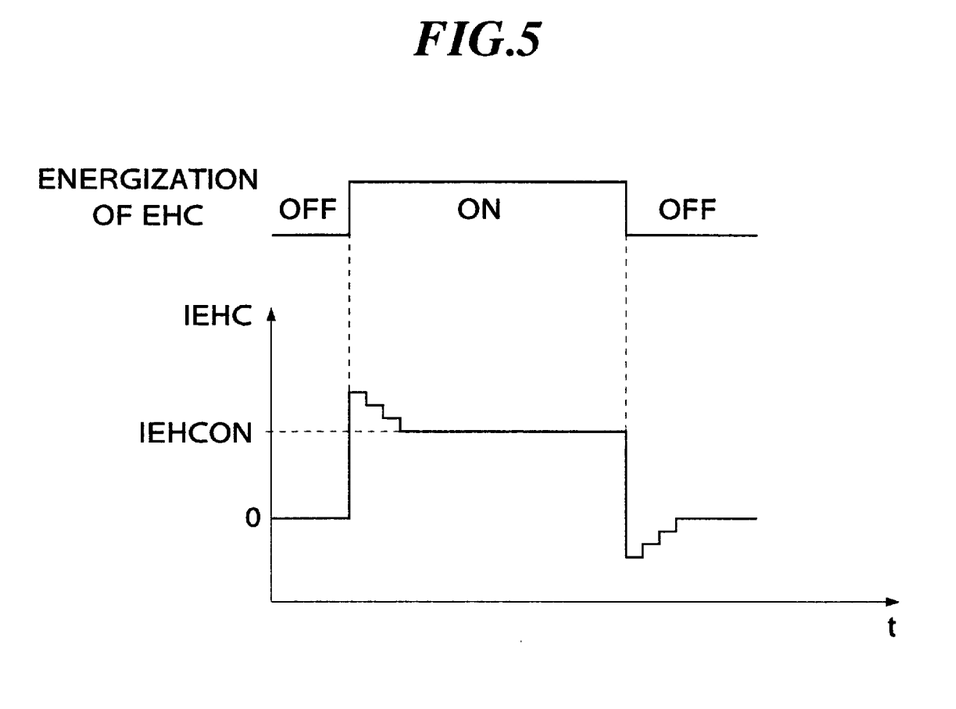
FIG. 5 is a diagram useful in explaining a manner of determining the electrically-heated catalyzer-dependent correction term KIEHC.

Further, as shown in FIG. 5, at the start of energization of the EHC 16, the correction term IEHC may be set to a larger value than the predetermined value IEHCON and then progressively decreased to the predetermined value IEHCON with the lapse of time, while upon termination of energization of the EHC 16, the correction term IEHC may be and then progress value and then progressively increased to "0" with the lapse of time. This makes it possible to prevent the engine rotational speed from undergoing undesired variations when the EHC 16 is switched between the ON state and the OFF state.

This invention is not limited to the above described embodiment, but it may also be applied, for example, to a variation of the FIG. 2 circuit in which the switch 23 is omitted, while the output voltage of the alternator 21 is fixed to the first predetermined value VALT1, and the connecting line 30 is directly connected to the output of the alternator 21, with a switch arranged in the connecting line 30 for switching the EHC 16 between the ON state and the OFF state.

What is claimed is:

1. In an intake air amount control system for an internal combustion engine installed in an automotive vehicle, said engine including an intake passage, and a throttle valve arranged in said intake passage, said vehicle having an alternator installed thereon which is driven by said engine, and electric devices including an electrically-heated catalyzer, electric power generated by said alternator being supplied to said electric devices, said intake air amount control system including a bypass passage bypassing said throttle valve, an intake air amount control valve arranged in said bypass passage for controlling an amount of air supplied to said intake passage at a location downstream of said throttle valve, and control means for controlling said intake air amount control valve in dependence on operatives states of said electric devices when said engine is in a predetermined operating condition, the improvement wherein said control means controls said intake air amount control valve by the use of a correction amount dependent on an operative state of said electrically-heated catalyzer, and an engine rotational speed sensor for detecting rotational speed of said engine, and wherein said control means sets said correction amount to a value dependent on said rotational speed of said engine detected by said engine rotational speed sensor when said electrically-heated catalyzer is being energized.

2. An intake air amount control system according to claim 1, wherein when said electrically-heated catalyzer is being energized, said control means sets said correction amount to a predetermined value, whereas when said electrically-heated catalyzer is not being energized, said control means sets said correction amount to zero.

3. An intake air amount control system according to claim 1, wherein said correction amount is set to a smaller value as said rotational speed of said engine is higher.

4. An intake air amount control system according to claim 1, including an atmospheric pressure sensor, and wherein said control means controls said intake air control valve in dependence on said operative states of said electric devices including said operative state of said electrically-heated catalyzer and said atmospheric pressure detected by said atmospheric pressure sensor.

5. An intake air amount control system according to claim 1, wherein said control means controls said intake air amount control system such that said rotational speed of said engine detected by said engine rotational speed sensor becomes equal to a desired value.

6. An intake air amount control system according to claim 1, wherein said intake air amount control valve comprises a solenoid valve, said control means controlling opening of said solenoid valve through control of electric current supplied to said solenoid valve.

7. In an intake air amount control system for an internal combustion engine installed in an automotive vehicle, said engine including an intake passage, and a throttle valve arranged in said intake passage, said vehicle having an alternator installed thereon which is driven by said engine, and electric devices including an electrically-heated catalyzer, electric power generated by said alternator being supplied to said electric devices, said intake air air amount control system including a bypass passage bypassing said throttle valve, an intake air amount control valve arranged in said bypass passage for controlling an amount of air supplied to said intake passage at a location downstream of said throttle valve, and control means for controlling said intake air amount control valve in dependence on operatives states of said electric devices when said engine is in a predetermined operating condition, the improvement wherein said control means controls said intake air amount control valve by the use of a correction amount dependent on an operative state of said electrically-heated catalyzer, wherein said control means sets said correction amount to a first predetermined value upon starting of energization of said electrically-heated catalyzer and then progressively decreases said correction amount to a second predetermined value smaller than said first predetermined value as time elapses, whereas said control means sets said correction amount to a negative value upon termination of the energization of said electrically-heated catalyzer and then progressively increases said correction amount to zero as time elapses.

8. In an intake air amount control system for an internal combustion engine installed in an automotive vehicle, said engine including an intake passage, and a throttle valve arranged in said intake passage, said vehicle having an alternator installed thereon which is driven by said engine, and electric devices including an electrically-heated catalyzer, electric power generated by said alternator being supplied to said electric devices, said intake air amount control system including a bypass passage bypassing said throttle valve, an intake air amount control valve arranged in said bypass passage for controlling an amount of air supplied to said intake passage at a location downstream of said throttle valve, and control means for controlling said intake air amount control valve in dependence on operatives states of said electric devices when said engine is in a predetermined operating condition, the improvement wherein said control means controls said intake air amount control valve by the use of a correction amount dependent on an operative state of said electrically-heated catalyzer, wherein said control means calculates a plurality of correction amounts respectively dependent on said operative states of said electric devices in addition to said correction amount dependent on said operative state of said electrically-heated catalyzer, and controls said intake air amount control valve by the use of said correction amount dependent on said operative state of said electrically-heated catalyzer and said plurality of correction amounts respectively dependent on said operative states of said electric devices.

* * * * *